United States Patent
Solow et al.

(10) Patent No.: US 10,637,872 B2
(45) Date of Patent: Apr. 28, 2020

(54) BEHAVIOR-BASED AUTHENTICATION

(71) Applicant: SYNAMEDIA LIMITED, Staines Upon Thames (GB)

(72) Inventors: Hillel Solow, Beit Shemesh (IL); Vered Anikster, Jerusalem (IL); David Wachtfogel, Jerusalem (IL)

(73) Assignee: SYNAMEDIA LIMITED, Middlesex (GB)

( * ) Notice: Subject to any disclaimer, the term of this patent is extended or adjusted under 35 U.S.C. 154(b) by 109 days.

(21) Appl. No.: 15/439,965

(22) Filed: Feb. 23, 2017

(65) Prior Publication Data

US 2018/0241759 A1    Aug. 23, 2018

(51) Int. Cl.
*H04L 29/06* (2006.01)
*H04L 29/08* (2006.01)
*H04N 21/258* (2011.01)
*G06F 21/10* (2013.01)
*H04W 12/00* (2009.01)

(52) U.S. Cl.
CPC .......... *H04L 63/108* (2013.01); *H04L 63/083* (2013.01); *H04L 63/107* (2013.01); *H04L 67/22* (2013.01); *H04N 21/25816* (2013.01); *H04N 21/25841* (2013.01); *G06F 21/10* (2013.01); *H04W 12/00502* (2019.01); *H04W 12/00503* (2019.01); *H04W 12/00505* (2019.01); *H04W 12/00508* (2019.01)

(58) Field of Classification Search
None
See application file for complete search history.

(56) References Cited

U.S. PATENT DOCUMENTS

| | | | |
|---|---|---|---|
| 8,312,157 | B2 | 11/2012 | Jakobsson et al. |
| 8,824,372 | B2 | 9/2014 | Hoggan et al. |
| 8,955,078 | B2 | 2/2015 | Hoggan et al. |
| 9,037,111 | B2 | 5/2015 | West |
| 9,451,443 | B1 | 9/2016 | Martell et al. |

(Continued)

OTHER PUBLICATIONS

Shih-Fu Chang, Anthony Vetro, Video Adaption: Concepts, Technologies, and Open Issues, 2005, Proc of IEEE, vol. 93, No. 1, pp. 148-158. (Year: 2005).*

(Continued)

*Primary Examiner* — Luu T Pham
*Assistant Examiner* — Edward X Long
(74) *Attorney, Agent, or Firm* — Merchant & Gould P.C.

(57) ABSTRACT

In one embodiment, a method includes receiving an access request for a video service from a client device, authorizing the client device to access the video service when the client device is initiating connection to the video service via a home Internet access point in a home associated with an authorized account for the video service, determining a time restriction for access to at least part of the video service when the client device is initiating connection to the video service via a non-home Internet access point located outside the home, a duration of the time restriction being dependent upon a usage behavior of the client device, and authorizing the client device to access the at least part of the video service subject to the time restriction when the client device is initiating connection to the video service via the non-home Internet access point.

15 Claims, 7 Drawing Sheets

(56) References Cited

U.S. PATENT DOCUMENTS

| | | | | |
|---|---|---|---|---|
| 2011/0167440 | A1* | 7/2011 | Greenfield | H04L 63/102 |
| | | | | 725/25 |
| 2016/0261621 | A1* | 9/2016 | Srivastava | H04L 63/1425 |
| 2016/0364794 | A1* | 12/2016 | Chari | G06Q 40/02 |
| 2017/0093875 | A1* | 3/2017 | de Freitas | H04W 12/06 |
| 2017/0124303 | A1* | 5/2017 | Baldwin | G06F 21/10 |

OTHER PUBLICATIONS

Fridman et al., Active Authentication on Mobile Devices via Stylometry, Application Usage, Web Browsing, and GPS Location, 2017, IEEE Systems Journal, vol. 11, No. 2, Jun. 2017. (Year: 2017).*

* cited by examiner

BEHAVIOR-BASED AUTHENTICATION

TECHNICAL FIELD

The present disclosure generally relates to authentication of a video service based on behavior.

BACKGROUND

In many systems, users are asked to login to video services in order to prove their identity. One such example is the use of TV viewing services over the Internet. Experience has shown that users are particularly bad at remembering or locating their passwords, and as such, video services seek to limit the frequency with which the passwords are requested, without compromising security. One such solution, often called Home Based Authentication, suggests that users are automatically able to view video services when they are in a location that is associated with them. This can be done, for example, by checking the public IP address of the device and checking if that IP address maps to an account that is also authorized to TV services. It could also utilize certificates or other credentials on the home network.

BRIEF DESCRIPTION OF THE DRAWINGS

The present disclosure will be understood and appreciated more fully from the following detailed description, taken in conjunction with the drawings in which:

FIGS. 2b-c are flow charts showing exemplary steps in a method of operation of the system of FIG. 2a;

FIG. 3b is flow chart showing exemplary steps in a method of operation of the system of FIG. 3a.

DESCRIPTION OF EXAMPLE EMBODIMENTS

Overview

Figure 1B:
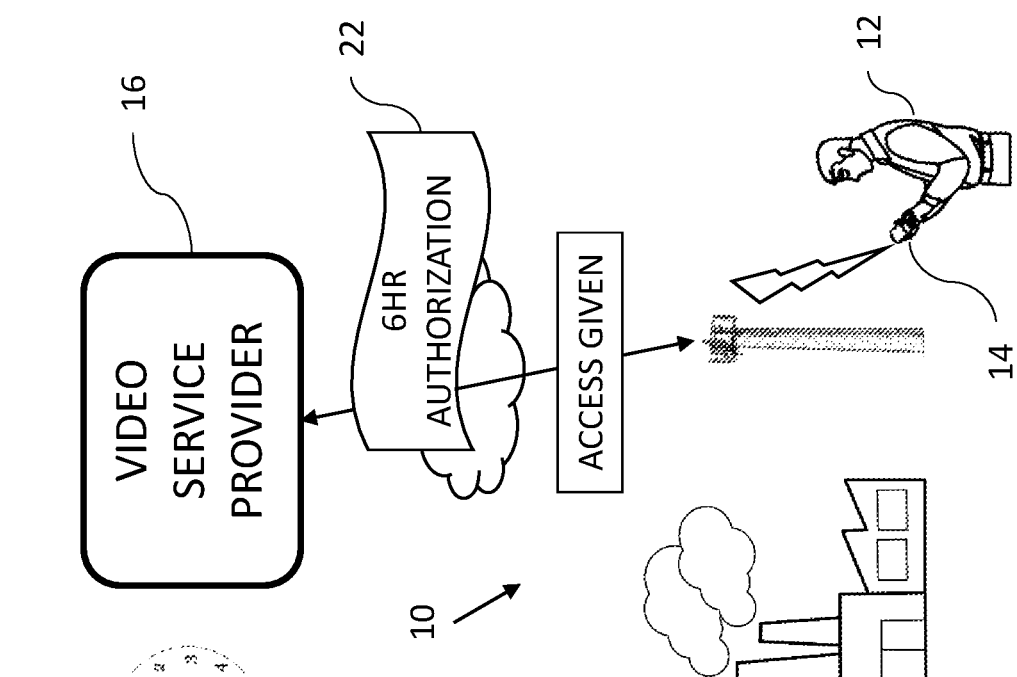
FIGS. 1a-d are partly pictorial, partly block diagram views of a behavior based authentication system constructed and operative in accordance with an embodiment of the present disclosure.

There is provided in accordance with an embodiment of the present disclosure, a method including receiving an access request for a video service from a client device, authorizing the client device to access the video service when the client device is initiating connection to the video service via a home Internet access point located in a home associated with an authorized account for the video service, determining a time restriction for access to at least part of the video service when the client device is initiating connection to the video service via a non-home Internet access point located outside of the home, a duration of the time restriction being dependent upon a usage behavior of the client device, and authorizing the client device to access the at least part of the service subject to the time restriction when the client device is initiating connection to the service via the non-home Internet access point.

DETAILED DESCRIPTION

As described above, Home Based Authentication allows TV viewing while the device is in the home, but not outside the home. This may be due to two significant concerns. First, authorization credentials could be copied off the original device and distributed to rogue devices. Devices that have transient access to the home might inadvertently be given long term access to a video service they are not entitled to. Home Based Authentication also has the undesirable effect that users are challenged to login to the video services once they leave the home when they are least likely to have access to those passwords.

Reference is now made to FIGS. 1a-d, which are partly pictorial, partly block diagram views of a behavior based authentication system 10 constructed and operative in accordance with an embodiment of the present disclosure. In overview, in the behavior based authentication system 10, client devices in the home will typically be granted automatic access to video service(s) that the home account is subscribed to. This could of course be limited to a certain subset of video services, such as for parental rating reasons, or due to other restrictions. The behavior based authentication system 10 provides access outside of the home, without users being prompted for credentials, based on usage behavior in the home. Specifically, the more the user behaves as a home account user is expected to behave, the less likely it is that he/she will be prompted to log in to the system 10.

The system 10 includes two embodiments, a rule based embodiment (described with reference to FIGS. 2a-c) and a data science based embodiment (described with reference to FIGS. 3a-b). The behavior based authentication system 10 extends the device's authorization even when that device leaves the home provided the device is behaving in some expected way. So for example, if a user has watched TV on his/her iPad several times at home, then even on the train ride to work the user will not be asked to login by the behavior based authentication system 10. After several weeks of watching at home, and on the train, the user is unlikely to be asked to login, even if the user flies to vacation for a week, as the user is still behaving within the constraints of what is expected of a home account user.

The operation of the behavior based authentication system 10 will now be described by way of an example, with reference to FIGS. 1a-d. FIG. 1a shows a user 12 with a hand-held device 14 attempting to gain access to a video service provided by a video service provider 16 from a home 20 of the user 12. Video content may be provided from the video service provider 16 or from a third party video content provider by way of example only. The video service provider 16 validates that the client device 14 is attempting to access the video service via a home Internet access point 18 associated with a valid user account. The video service provider 16 provides access to the video service while the client device 14 is connected via the home Internet access point 18 in the home 20. It should be noted that the home 20 may include other access points such as wireless access points which are connected to the home Internet access point 18. Even if the client device connects via one of the other access points in the home 20, it is the identity of the home Internet access point 18 which is utilized by the video service provider 16 to determine whether the access by the client device 14 is from a home associated with a valid user account. The video service provider 16 also provides an authorization 22 to allow the client device 14 to connect to the video service for another 6 hours from any location, including when the client device 14 is connected to the video service, via a non-home Internet access point located outside of the home 20. The non-home Internet access point may be in a non-authorized home, in an authorized home but not the authorized home of the user of the client device 14, via a cellphone network connection (for example, but not limited to a 3G or 4G connection) or via a wireless Internet connection from a public location such as a shopping center or airport, by way of example only. The term "home Internet access point" and "non-home Internet access point" are used to differentiate Internet access points located in the home 20 and outside the home 20, respectively. The terms "home Internet access point" and the "non-home Internet access point" do not necessarily imply that the hardware and/or software used in the access points are the same or different. The authorization 22 may be disposed in a token, cookie or certificate which is stored in the client device 14 for later use, by way of example only.

Figure 1A:
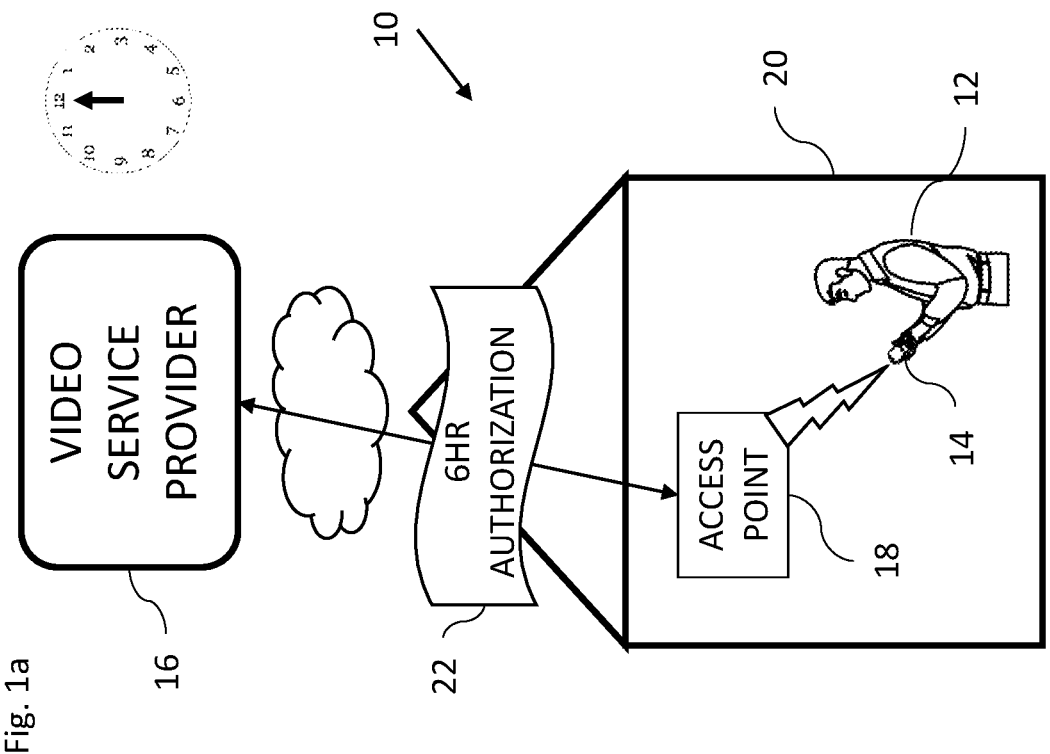

FIG. 1*b* shows the user 12 of the client device 14 attempting to connect to the video service outside of the home 20. The client device 14 presents the video service provider 16 with the previously stored authorization 22 which is validated by the video service provider 16. As the current time is still within the expiry of the 6 hour limit of the authorization 22, the video service provider 16 provides the client device 14 with access to the video service. The video service provider 16 may allow access to the video service to continue as long as the client device 14 does not leave the video service, i.e., the same session may continue even after the 6 hour limit has expired. Alternatively, the video service provider 16 may deny further access to the video service when the 6 hour limit expires even in the same session.

Figure 1D:
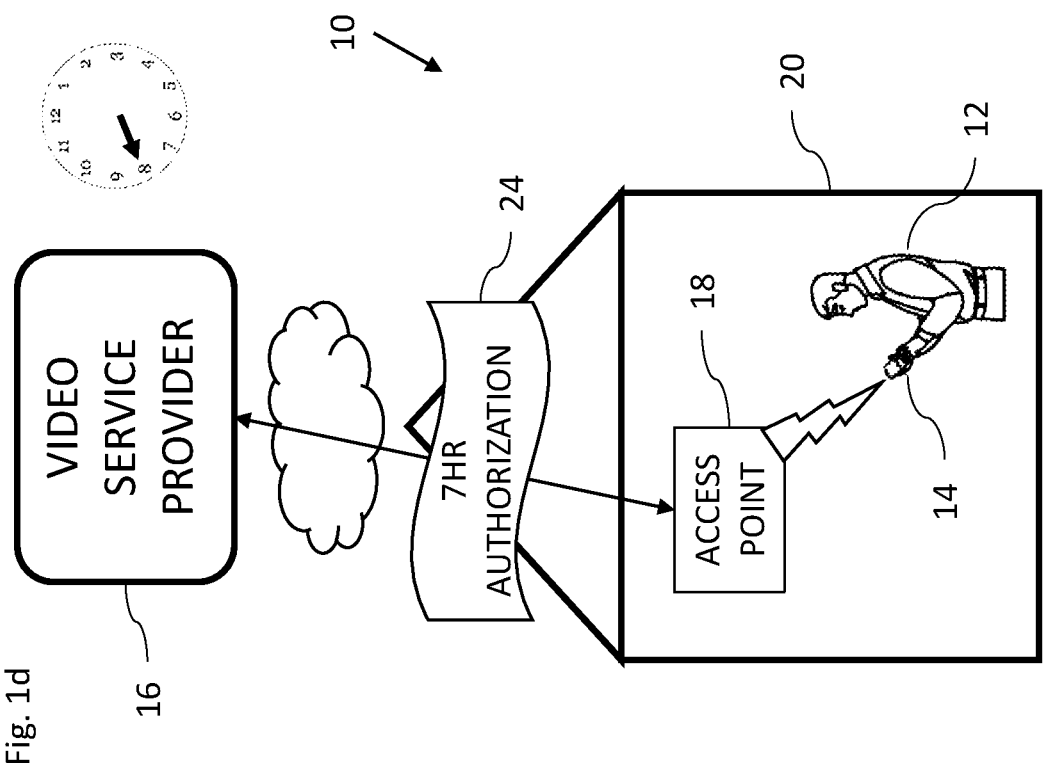
Figure 1C:
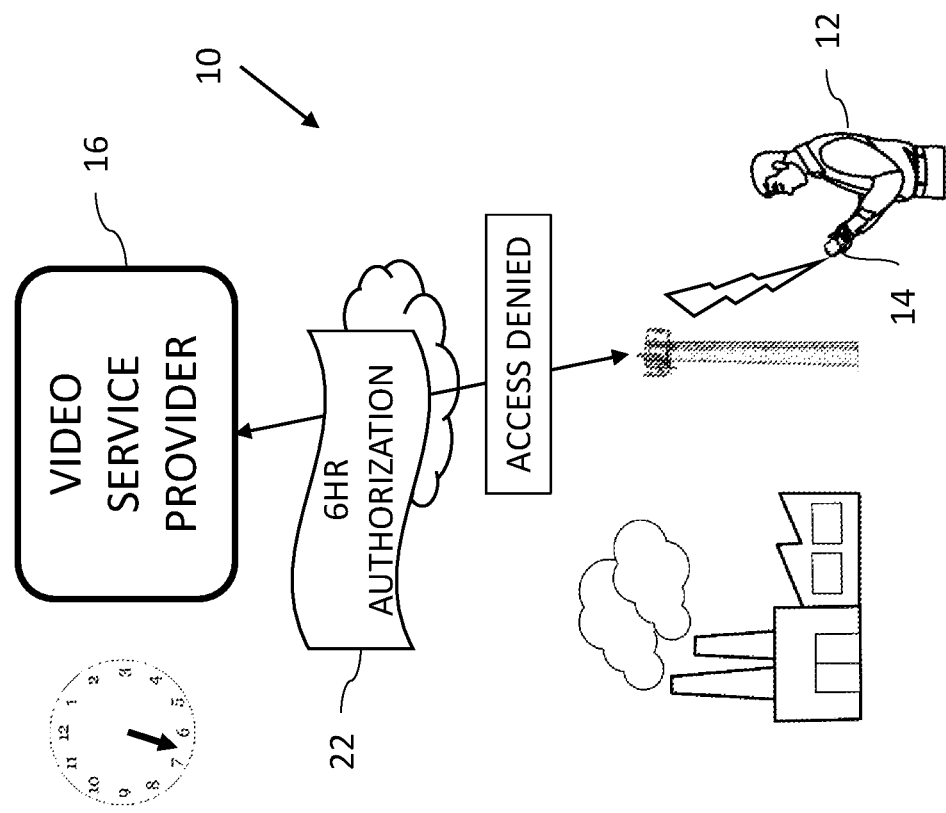

FIG. 1*c* shows the user 12 of the client device 14 attempting to connect to the video service outside of the home 20 after the expiry of the 6 hour limit. The client device 14 presents the video service provider 16 with the previously stored authorization 22 which is validated by the video service provider 16. As the current time is after the expiry of the 6 hour limit of the authorization 22, the video service provider 16 denies the client device 14 access to the video service.

FIG. 1*d* shows the user 12 of the client device 14 attempting to connect to the video service inside the home 20 later the same day. This additional attempt to connect to the video service provides further proof that the user 12 of the client device 14 is behaving like a home account user. The video service provider 16 provides an authorization 24 for the client device 14 to connect to the video service from any location for an increased time limit of 7 hours.

Figure 2A:
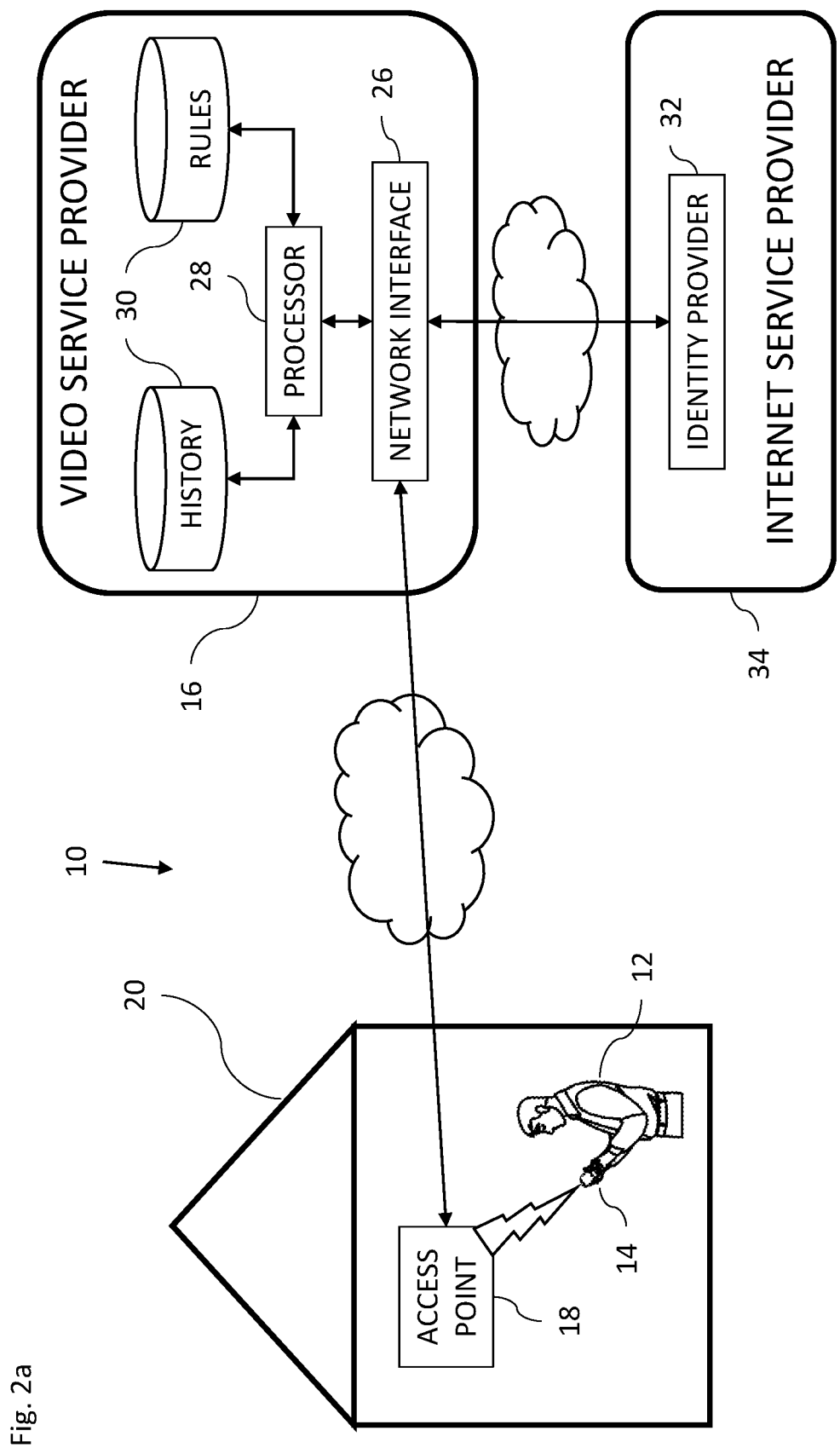
FIG. 2a is a partly pictorial, partly block diagram view of a first embodiment of the system of FIGS. 1a-d.

Reference is now made to FIG. 2*a*, which is a partly pictorial, partly block diagram view of a first embodiment of the system 10 of FIGS. 1*a-d*. FIG. 2*a* shows the user 12 of the client device 14 attempting to connect to a video service of the video service provider 16 via the home Internet access point 18 in the home 20. The home Internet access point 18 may be connected to the video service provider 16 by any suitable communication link, for example, but not limited to, cable, Internet Protocol, mobile communication network or any suitable combination thereof. The video service provider 16 typically includes a network interface 26, a processor 28 and one or more storage devices 30. The network interface 26 is operative to transmit and receive data, to and from various external devices, for example, the home Internet access point 18 and an identity provider 32 of an Internet service provider 34. The storage devices 30 are operative to store data used by the processor 28, including user history and rules, described in more detail below with reference to FIGS. 2*b-c*.

Figure 2B:
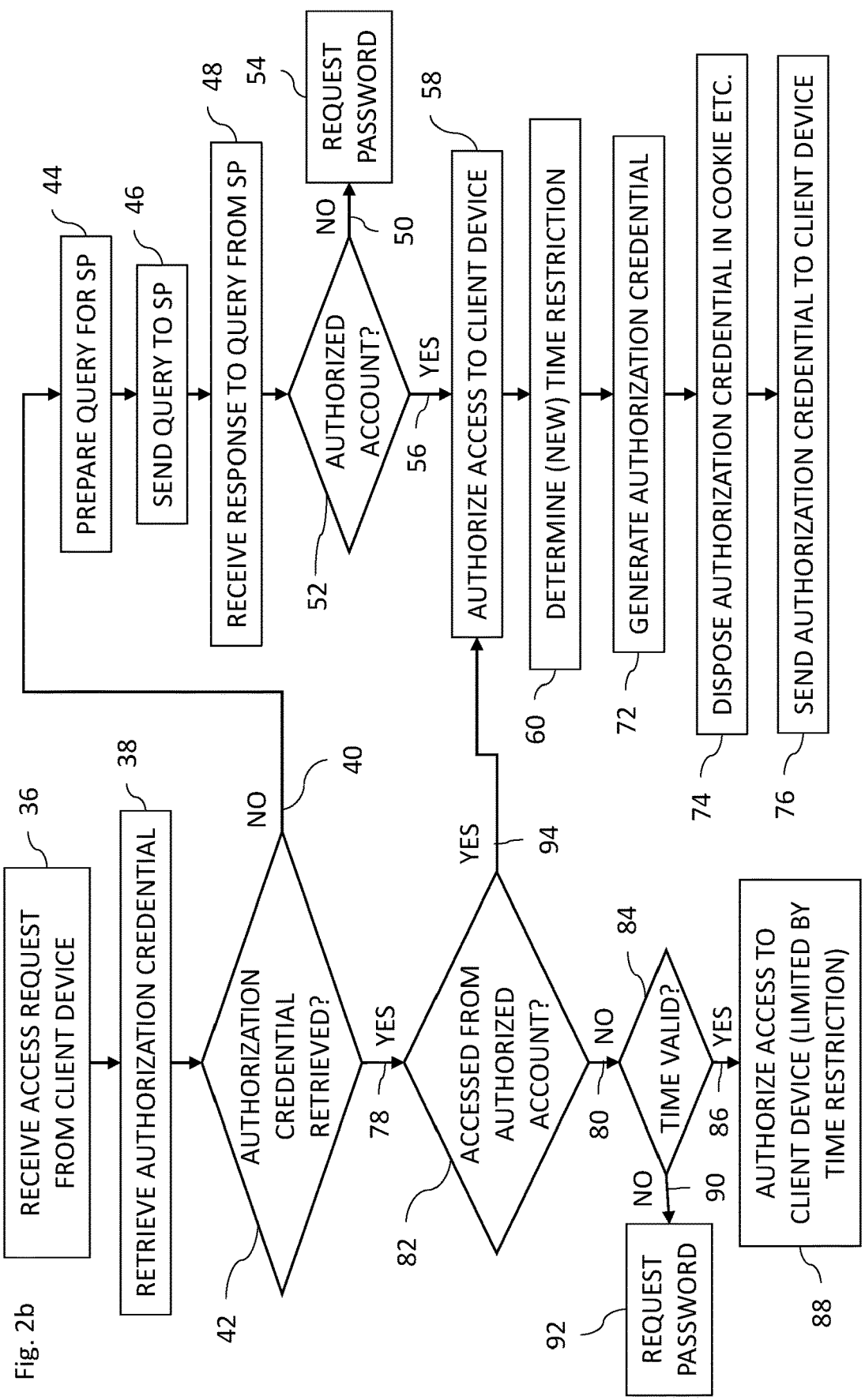
Figure 2C:
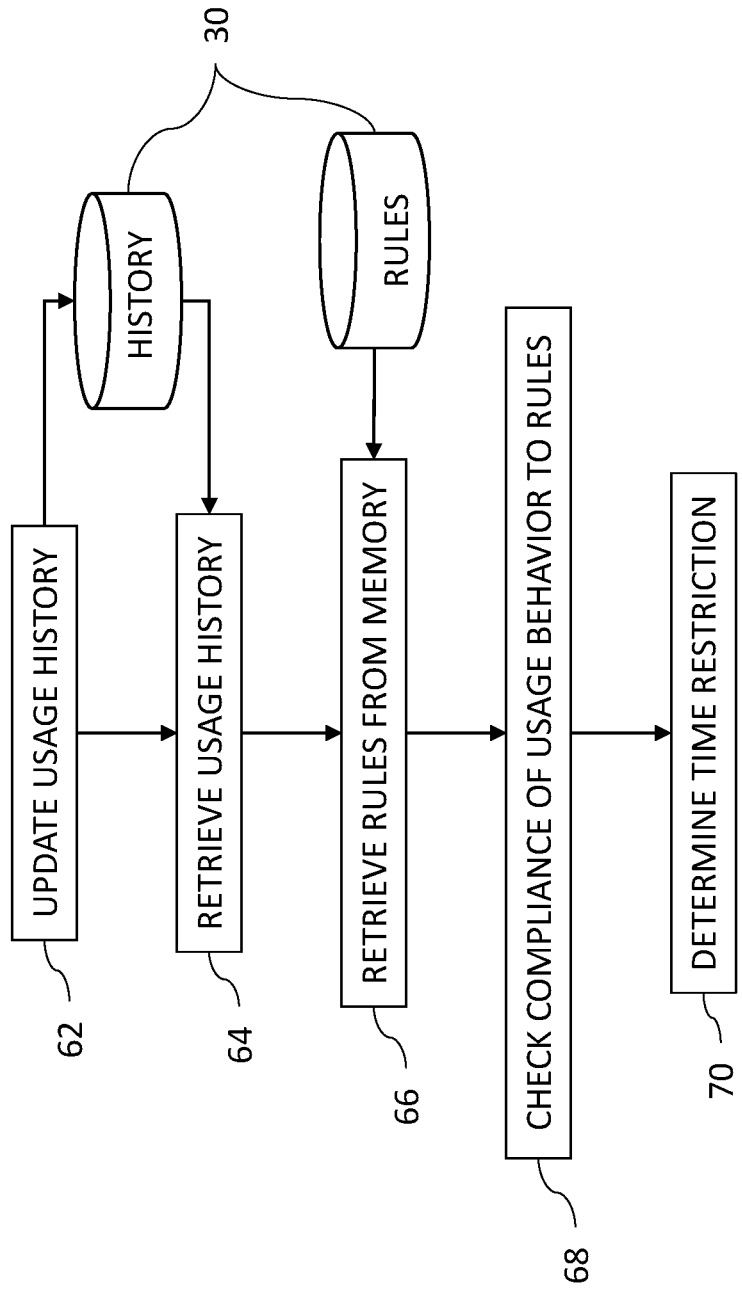

Reference is additionally made to FIGS. 2*b-c*, which are flow charts showing exemplary steps in a method of operation of the system 10 of FIG. 2*a*. The network interface 26 is operative to receive an access request for a video service from the client device 14 (block 36). The processor 28 is operative to attempt to retrieve a previously stored authorization credential from the client device 14 (block 38). It should be noted that the authorization credential may not be successfully retrieved if for example the authorization credential has been deleted from the client device 14. By way of another example, the authorization credential may not be successfully retrieved if the client device 14 has not previously been issued with an authorization credential as this is the first time the client device 14 is requesting access to the video service with a new device of the user 12 in the home 20.

If the authorization credential is not successfully retrieved (branch 40 of decision point 42), the processor 28 continues to determine if the client device 14 is initiating connection to the video service via an access point in a home associated with an authorized account. The processor 28 is operative to prepare a query to determine if an identification (e.g., Internet Protocol (IP) address) of the home Internet access point 18 is associated with an authorized account for the video service (block 44). The network interface 26 is operative to: send the query to the identity provider 32 of the Internet service provider 34 (block 46); and receive a response to the query from the identity provider 32 of the Internet service provider 34 (block 48). The identity provider generally stores a list of the homes with authorized accounts for the video service and the identities of the home Internet access points of the homes. The response indicates if the home Internet access point 18 is associated with an authorized account for the video service. It will be appreciated that the identity provider 32 may be disposed in the video service provider 16. It will also be appreciated that the network interface 26 may be under control of the processor 28. It will be appreciated that other methods may be used to determine if the access request is associated with an authorized account, for example, but not limited to, using certificates or other credentials stored on the home network. If the response indicates that the home Internet access point 18 is not associated with an authorized account for the video service (branch 50 of decision point 52), access to the video service may be provided on provision of a valid password provided by the user 12 (block 54). If the response indicates that the home Internet access point 18 is associated with an authorized account for the video service (branch 56 of the decision point 52), the processor 28 is operative to authorize the client device 14 to access the video service when the client device is initiating connection to the video service via the home Internet access point 18 (block 58) located in the home 20 associated with an authorized account for the video server. Part of the process of the step of block 58 is to provide current access to the video service for the current request of the client device 14. Part of the process of the step of block 58 is to generate an authentication credential for storage by the client device 14 for future access requests via the home Internet access point 18. The authentication credential may include an identity identifying the home 20, for example, but not limited to a subscriber ID and/or user ID. The identity of the home 20 is typically associated/linked with an identity of the home Internet access point 18 and stored by the processor 28 in the video service provider 16. In response to a future access request, the identity of the home 20 included in the authentication credential stored by the client device 14 may then be used to retrieve the identity of the home Internet Access point 18 stored in the video service provider 16. The retrieved identity of the home Internet access point 18 is then matched to the identity of an access point identified in the future access request in order to recognize the access request as coming from an access point associated with an authorized account for the video service without having to query the identity provider 32 or other such method. The authentication credential typically also includes an additional identification which identifies the client device 14 when the client device 14 requests access to the video service at some future time. The identification of the client device 14 and/or the identity of the home 20 may be used to read and write user history and other data about the client device 14 and/or the user of the client device 14 in the storage device(s) 30, described in more detail below.

The processor 28 is operative to determine a time restriction for access to at least part of the video service when the client device is initiating connection to the video service via a non-home Internet access point located outside of the home 20 (block 60). For example, access may be given to all content, including premium content, in the home 20 but only to free content outside the home 20. A duration of the time restriction is dependent upon a usage behavior of the client device 14. The usage behavior may be general usage behavior of the client device 14 and/or usage behavior by the client device 14 of the requested video service.

The step of block 60 is now described in more detail with reference to the sub-steps shown in FIG. 2c. The processor 28 is operative to update the usage history with the usage of the video service by the client device 14 and other usage data of the client device 14 if that data is used in decision making by the behavior based authentication system 10 (block 62). At this point, the new access request is logged by the processor 28 in a history database stored by the storage device(s) 30. At a later stage, the processor 28 may also log when the client device 14 completes a session as well as other information, for example, but not limited to, which channels are viewed and which programs are viewed. The history data is logged in the history database along with the identifier of the client device 14 and/or the identity of the home 20 (created with the authentication credential). It will be appreciated that usage history may additionally or alternatively be stored in a cookie or token, discussed later, which is stored by the client device 14. The processor 28 is also operative to retrieve usage history including usage history from previous sessions associated with the ID of the client device 14 and/or the identity of the home 20 (block 64). The processor 28 is operative to retrieve rules from the storage device(s) 30 (block 66). The processor 28 is operative to check compliance of the usage behavior (from the retrieved usage history including the current access attempt) of the client device 14 to the rules (block 68) to determine the duration of the time restriction (block 70). For example, if the usage behavior complies with a first rule, the time restriction is set to a first value and if the usage behavior complies with a second rule, the time restriction is set to a second value different from the first value. The rules are defined so that the more that the usage behavior is indicative of a home account user, the time restriction is set to a greater (and therefore more lenient) value. Some example rules now follow. By way of a first example, the rules may be defined so that first time access via the home Internet access point 18 sets the out-of-home duration (time restriction) to 6 hours and each subsequent access to the video service via the home Internet access point 18 increases the out-of-home duration (i.e. the time restriction) by 1 hour, optionally until some limit is reached. If the time restriction has expired prior to renewed access via the home Internet access point 18 and the user doesn't login with a password, the duration of the time restriction is reset to 6 hours. By way of a second example, the rules may be defined based on average access via the home Internet access point 18 over the previous month. If access is below is below X hours on average per day, then the time restriction is set to a minimum of A hours. If access is between X and Y hours on average per day, then the time restriction is set to B hours. If access is between Y and Z hours on average per day, then the time restriction is set to C hours, and so on.

The rules may be dependent on various factors such as the day of week, time of day (e.g., nighttime usage might be more valuable as proof-of-residence) and duration of use of the video service via the home Internet access point 18 over any suitable combination of time periods. The rules may be different in one geographical location from another. For example, rules in one city may be different from rules in another city. For example, say that after some research it has been determined that California based users tend to watch TV in home on their iPads during the weekdays, and not outside the home very often (because they mostly drive to work), but on the weekend they often watch sports outside the home. As long as the user behaves approximately this way, the rules of the system 10 will not prompt the user for a password even on weekends.

The rules may be different for different device types. The rules selected for use for a particular device 14 may be the same rules selected for another device or devices accessing the video service via the home Internet access point 18 in the same home 20.

The rules for devices in the same home 20 may be selected from a selection of rules based on known information about a subscriber in the home, possibly collected when the user(s) in the home originally subscribed to the video service. The assignment of which rules are to be used with which device 14, if assigned, may be saved in the storage device(s) 30 and/or in the authorization credential generated for the client device 14.

Reference is again made to FIG. 2b. The processor 28 is operative to generate an authorization credential authorizing the client device to access at least part of the video service subject to the time restriction when the client device 14 is not connected via the home Internet access point 18 (block 72). The processor 28 is operative to dispose the authorization credentials (generated in steps 58 and/or 72) in one of the following: a token; a cookie; or a certificate, for sending the authorization credentials to the client device (block 74) by way of example only. It will be appreciated that the authorization credentials may be disposed in two or more tokens, cookies or certificates or any suitable combination thereof. The network interface 26 is operative to send the authorization credentials in the token/cookie/certificate to the client device 14 (block 76). Optionally the cookie(s), token(s) or certificate(s) may be bound to the client device 14 using techniques known in the art of digital rights management.

At a later time, the client device 14 may request access to the video service, via a non-home Internet access point located outside of the home 20. The access request is received by the network interface 26 of the video service provider 16 (block 36). The processor 28 is operative to attempt to retrieve the authorization credential from the client device 14. The network interface 26 receives the authorization credentials in the token/cookie/certificate (branch 78 of the decision point 42). The authorization credentials include an identity of the home 20. The processor 28 looks up the identity of the home Internet access point 18 associated with the identity of the home 20 in the storage of the video service provider 16 and compares the identity of the home Internet access point 18 with the identification of the access point used currently by the client device 14 to access the video service in order to validate the identification of the access point currently being used for access. In this case, the client device 14 is not using the home Internet access point 18 and so this authorization fails (branch 80 of decision point 82). At decision point 84, the processor 28 determines if the current time is still within the time restriction included in the authorization credential. If the current time is still within the time restriction (branch 86), the processor 28 is operative to authorize the client device 14 to access at least part of the video service subject to the time restriction (and optionally limited by the time restriction such that access is stopped at the conclusion of the time restriction) (block 88). If the current time is after the time restriction (branch 90), the processor 28 generates a password request in order for the user 12 to gain access to the video service (block 92).

At another time, the client device 14 may request access to the video service again via the home Internet access point 18 in the home 20. The access request is received by the network interface 26 of the video service provider 16 (block 36). The processor 28 is operative to attempt to retrieve the authorization credential from the client device 14. The network interface 26 receives the authorization credential in the token/cookie/certificate (branch 78 of the decision point 42). The processor 28 looks up the identity of the home Internet access point 18 associated with the identity of the home 20 in the storage of the video service provider 16 and compares the identity of the home Internet access point 18 with the identification of the access point used currently by the client device 14 to access the video service in order to validate the identification of the access point currently being used to access the video service. In this case, the client device 14 is accessing via the home Internet access point 18 and so this validation passes (branch 94 of decision point 82). In the step of block 58, access to the video service is authorized. The processing of the steps of blocks 60-76 (of FIGS. 2b and 2c) is performed which may result in a different time restriction being determined based on updated usage behavior. It will be appreciated that many of the steps described above with reference with FIGS. 2b and *c* may be performed in any suitable order.

The home 20 may include one or more home Internet access points 18 for example, the home 20 may be subscribed to different Internet Service Providers. Each of the home Internet access points 18 may be associated with the authorized user account for the video service. In such a case, connection to any of the home Internet access points 18 allows the client device 14 access to the video service and also provides the client device 14 with authentication credentials for connecting to the video service outside of the home 20 without having to provide a password. The method of operation of FIGS. 2b and 2c may also be used for a home with multiple Internet access points 18 with the following changes by way of example only. When the identity provider 32 is queried, the query may be generated to retrieve the identities of all the Internet access points 18 in the home 20 so that when the client device 14 attempts to access the video service by any of the Internet access points, the video service provider 16 may determine in step 82 of FIG. 2b whether the client device is accessing from the home 20 of the authorized account. Alternatively or additionally, every time the client device 14 attempts to access the video service the steps of blocks 44-48 will first be performed and if the access is not recognized as being from an authorized account, the steps of blocks 38, 42 and 84 will be performed. It will be appreciated that when there are more than one home Internet access point 18 in the home 20, there may be more than one identity provider 32 implemented at: different Internet Service Providers; or an identity provider 32 implemented in the video service provider and/or at one or more Internet Service Providers.

Figure 3A:
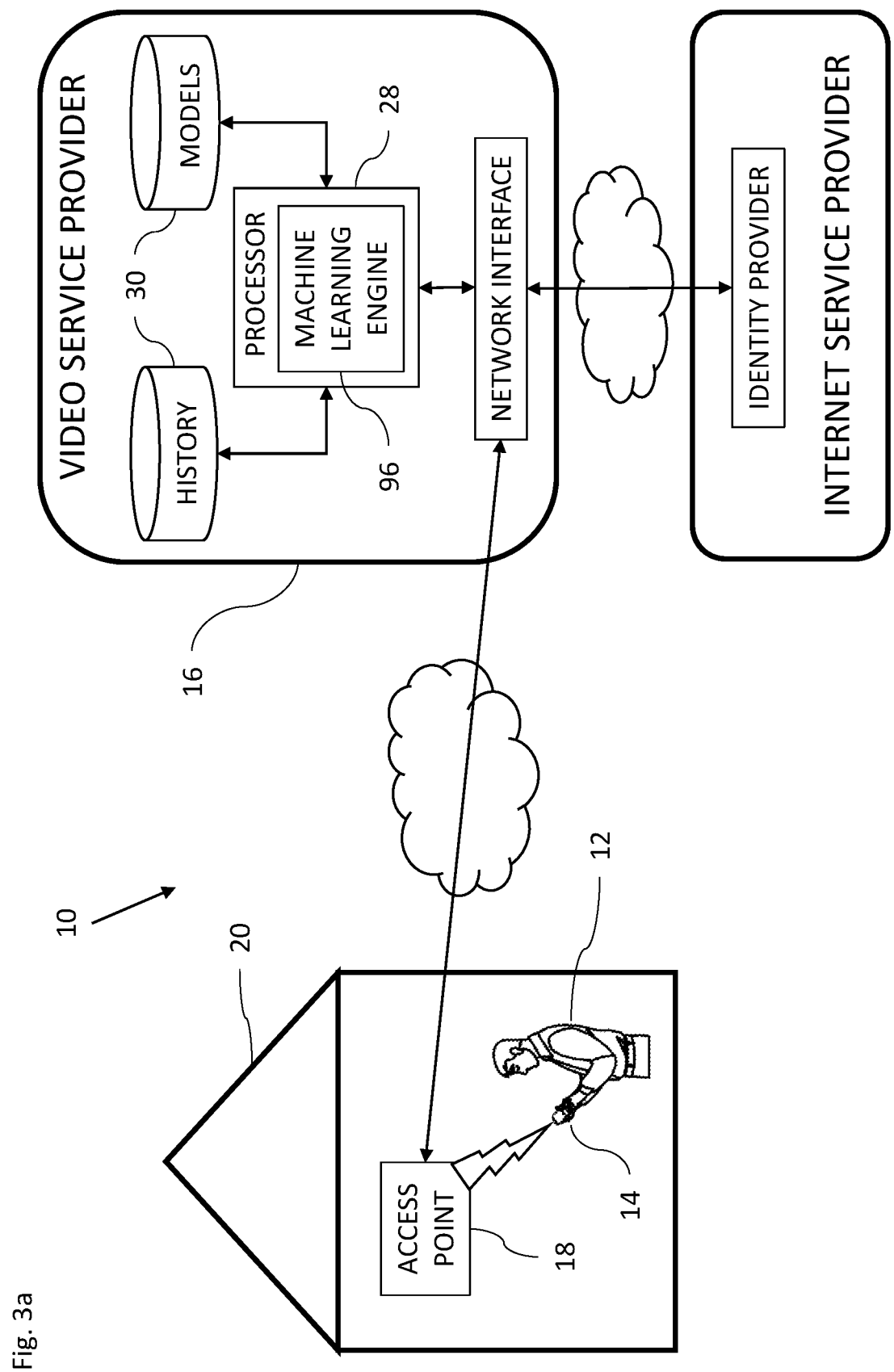
FIG. 3a is a partly pictorial, partly block diagram view of a second embodiment of the system of FIGS. 1a-d.

Reference is now made to FIG. 3a, which is a partly pictorial, partly block diagram view of a second embodiment of the system 10 of FIGS. 1a-d. The second embodiment of the behavior based authentication system 10 of FIG. 3a is substantially the same as the first embodiment of the system 10 of FIG. 2a except that the rules are replaced by one or more expected usage behavior models which are learnt based on machine learning techniques from the usage history data of users of the behavior based authentication system 10. The models are stored by the storage device(s) 30 of the video service provider 16. The processor 28 typically runs a machine learning engine 96 which may use any appropriate machine learning algorithm, for example, but not limited to, random forests, logistic regression, or autoencoders, in order to generate one or more expected usage behavior models based on the usage history data. The machine learning engine 96 may generate a single expected usage behavior model or different models for different geographical regions and/or different ethnic origins and/or different age groups etc. If more than one model is used, the client device 14 attempting to access the behavior based authentication system 10 is assigned one of the models. The usage behavior of the client device 14 is compared to the selected model and a score is computed. The time restriction is then computed based on the score so that the higher the correlation between the usage behavior of the client device 14 and the selected model, the higher the time restriction and therefore more out of home access to the video service is approved. The method of operation of the second embodiment of the system 10 of FIG. 3a is now described in more detail below with reference to FIG. 3b.

Figure 3B:
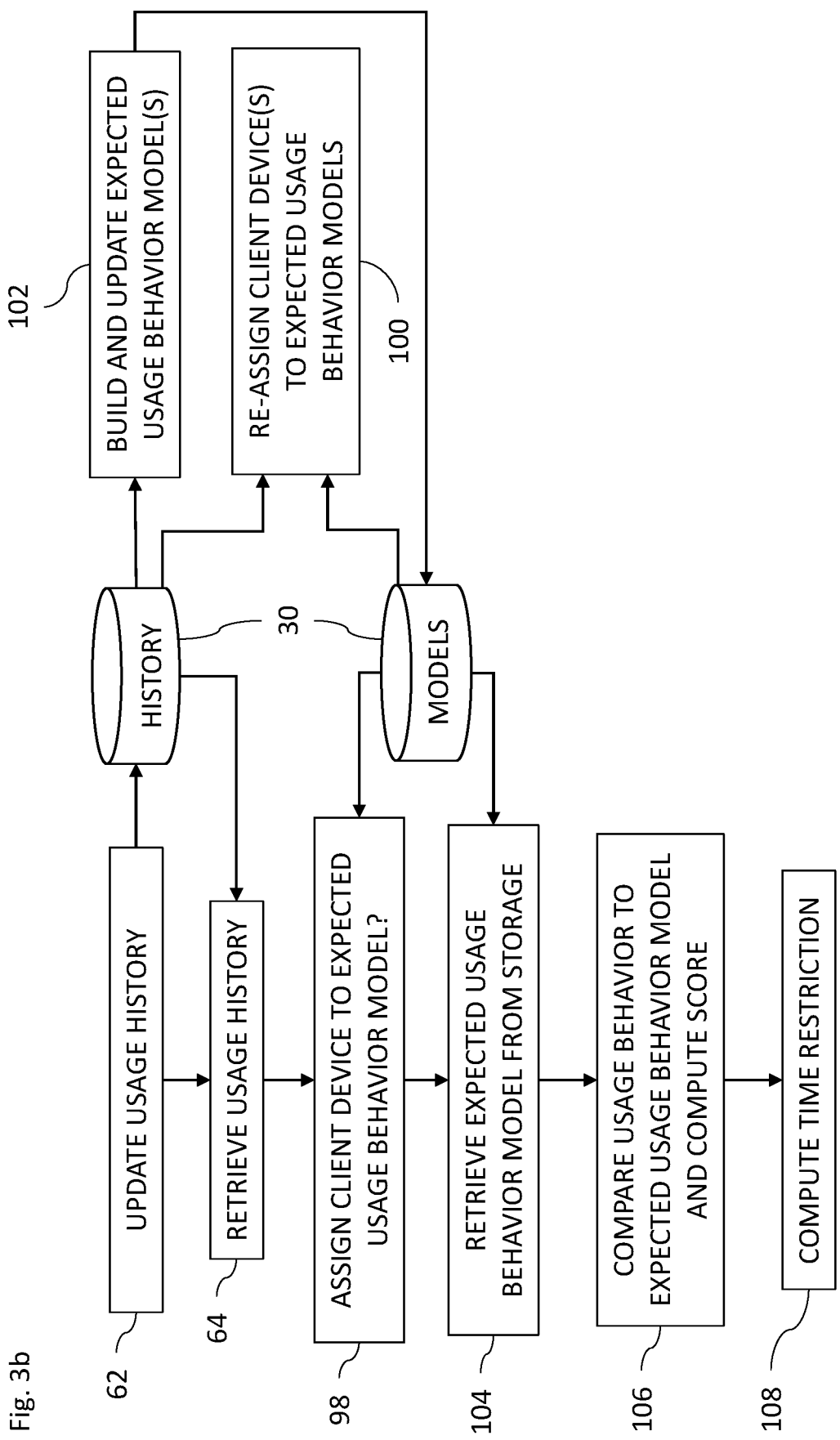

Reference is now made to FIG. 3b, which is flow chart showing exemplary steps in a method of operation of the system of FIG. 3a. Reference is also made to FIG. 3a. The method of operation described with reference to FIG. 2b may also be used for the second embodiment of the system of FIG. 3a except that step 60 and its sub-steps are tailored to using the behavior models rather than the rules. FIG. 3b shows exemplary sub-steps of the step 60 of FIG. 2b. The sub-steps shown in FIG. 3b are tailored for the behavior models of the second embodiment of the behavior based authentication system 10 of FIG. 3a. The sub-steps are now described in more detail.

The processor 28 is operative to update the usage history (block 62) and retrieve the usage history (block 64) substantially in the same way as described with reference to FIG. 2c. The processor 28 is operative to run the machine learning engine 96 to build and update the expected usage behavior model(s) based on usage behavior feedback (stored in the storage device(s) 30 as the usage history) from a plurality of client devices 14 (only one shown in the FIGS. 1a-d, 2a, 3a for the sake of simplicity) (block 102). If the client device 14 has not been previously assigned to one of the expected usage behavior models, the processor 28 is operative to select one of the expected usage behavior models for the client device to which to compare usage behavior (block 98). Assigning the client device 14 to one of the models may be based on a geographical region and/or an ethnic group and/or an age group associated with the client device 14 by way of example only. Information regarding ethnic group and/or age group may be obtained from user information provided when a user in the home 20 associated with the home Internet access point 18 subscribed to the video service or based on the type of content being consumed by the client device 14 or other devices in the same home 20 as the client device 14, by way of example only. The assignment of a model to the client device 14 may be updated on a periodic basis which may lead to the client device 14 being reassigned to a different one of the models. Updating (re-assigning) the assignment of device(s) 14 to models may be performed on a batch basis periodically (block 100) based on history and models stored in the storage device(s) 30. The assignment of the client device 14 to one of the models may be saved in the storage device(s) 30 and/or in the authorization credential generated for the client device 14.

The processor 28 is operative to retrieve the previously selected expected usage behavior model from the storage device(s) 30 (block 104). The processor 28 is operative to compare the usage behavior of the client device 14 to the selected expected usage behavior model to determine the duration of the time restriction. The comparison step generally includes the processor 28 computing a score reflecting a similarity of the usage behavior of the client device 14 to the selected expected usage behavior model (block 106). The score may be equal to, or be a function of, a distance for example, but not limited to, a Mahalanobis distance, Kullback-Leibler distance or Hellinger distance, between the usage behavior of the client device 14 and the selected expected usage behavior model. The processor 28 is operative to compute the time restriction with the score as input (block 108). The time restriction is generally computed as a function of the score, e.g., F(s), where F is a function and s is the score. The function may be a linear function or a non-linear function whereby the time restriction increases at an increasing or decreasing rate with the score. It will be appreciated that the many of the steps described above with reference with FIG. 3b may be performed in any suitable order.

It will be appreciated that the processing performed by the video service provider 16 described above with reference to FIGS. 2a-3b may be at least partially performed by a cloud hosted application and/or at least partially using cloud hosted storage. In practice, some or all of the functions of the processor 28 may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A method comprising:
receiving an access request for a video service from a client device;
authorizing the client device to access the video service when the client device is initiating connection to the video service via a home Internet access point located in a home associated with an authorized account for the video service, wherein the video service is provided from a video service provider to the client device through the home Internet access point;
determining a time restriction for access to at least part of the video service from the video service provider when the client device is initiating connection to the video service via a non-home Internet access point located outside of the home, wherein a duration of the time restriction is dependent upon a usage behavior of the video service by the client device, wherein determining the time restriction comprises:
selecting a first expected usage behavior model from a plurality of expected usage behavior models for the client device, wherein the first expected usage behavior model is selected from the plurality of expected usage behavior models based on the usage behavior of the client device, wherein a first expected usage behavior of the plurality of usage behaviors is associated with a first duration and a second expected usage behavior of the plurality of usage behaviors is associated with a second duration, the second duration being greater than the first duration and the second expected user behavior comprising a longer usage of the home Internet access point than the first expected usage behavior,
comparing the usage behavior of the client device to the first expected usage behavior model to determine the duration of the time restriction,
determining a score reflecting a similarity of the usage behavior of the client device to the first expected usage behavior model, wherein the score comprises a function of a distance between the usage behavior of the client device and the first expected usage behavior model, and
determining the time restriction with the score as an input, wherein the time restriction is inversely proportional to the score; and
authorizing the client device to access the at least part of the video service from the video service provider subject to the time restriction when the client device is initiating connection to the video service via the non-home Internet access point.

2. The method according to claim 1, further comprising:
preparing a query to determine if an identification of the home Internet access point is associated with an authorized account for the video service;
sending the query to an identity provider;

receiving a response to the query from the identity provider, the response indicating the home Internet access point is associated with an authorized account for the video service; and authorizing the access to the video service and the at least part of the video service based on the response received from the identity provider.

3. The method according to claim 1, further comprising:
generating an authorization credential authorizing the client device to access the at least part of the video service subject to the time restriction; and
sending the authorization credential to the client device.

4. The method according to claim 3, further comprising disposing the authorization credential in one of the following: a token; a cookie; or a certificate, for sending the authorization credential to the client device.

5. The method according to claim 1, further comprising building and updating the first expected usage behavior model based on usage behavior feedback from a plurality of client devices.

6. A system comprising:
a memory storage; and
a processor coupled to the memory storage, wherein the processor is operative to:
  authorize a client device to access a video service when the client device is initiating connection to the video service via a home Internet access point located in a home associated with an authorized account for the video service, wherein the video service is provided from a video service provider to the client device through the home Internet access point;
  determine a time restriction for access to at least part of the video service from the video service provider when the client device is initiating connection to the video service via a non-home Internet access point located outside of the home, wherein a duration of the time restriction dependent upon a usage behavior of the video service by the client device, wherein the processor being operative to determine the time restriction comprises the processor being operative to:
    select a first expected usage behavior model from a plurality of expected usage behavior models for the client device, wherein the first expected usage behavior model is selected from the plurality of expected usage behavior models based on the usage behavior of the client device, wherein a first expected usage behavior of the plurality of usage behaviors is associated with a first duration and a second expected usage behavior of the plurality of usage behaviors is associated with a second duration, the second duration being greater than the first duration and the second expected user behavior comprising a longer usage of the home Internet access point than the first expected usage behavior,
    compare the usage behavior of the client device to a first expected usage behavior model to determine the duration of the time restriction,
    determine a score reflecting a similarity of the usage behavior of the client device to the first expected usage behavior model, wherein the score comprises a function of a distance between the usage behavior of the client device and the first expected usage behavior model, and
    determine the time restriction with the score as an input, wherein the time restriction is inversely proportional to the score; and
  authorize the client device to access the at least part of the video service from the video service provider subject to the time restriction when the client device is initiating connection to the video service via the non-home Internet access point.

7. The system according to claim 6, wherein the processor is further operative to:
prepare a query to determine if an identification of the home Internet access point is associated with an authorized account for the video service;
send the query to an identity provider;
receive a response to the query from the identity provider, the response indicating the home Internet access point is associated with an authorized account for the video service; and
authorize the access to the video service and the at least part of the video service based on the response received from the identity provider.

8. The system according to claim 6, wherein the processor is further operative to:
generate an authorization credential authorizing the client device to access the at least part of the video service subject to the time restriction; and
send the authorization credential to the client device.

9. The system according to claim 8, wherein the processor is operative to dispose the authorization credential in one of the following: a token; a cookie; or a certificate, for sending the authorization credential to the client device.

10. The system according to claim 6, wherein the processor is operative to check compliance of the usage behavior of the client device to a plurality of rules to determine the duration of the time restriction, wherein: if the usage behavior complies with a first rule of the plurality of rules, the time restriction is set to a first value; and if the usage behavior complies with a second rule of the plurality of rules, the time restriction is set to a second value different from the first value.

11. The system according to claim 6, wherein the processor is operative to build and update the first expected usage behavior model based on usage behavior feedback from a plurality of client devices.

12. A non-transient computer-readable medium that stores a set of instructions when executed perform a method executed by the set of instructions comprising:
receiving an access request for a video service from a client device;
authorizing the client device to access the video service when the client device is initiating connection to the video service via a home Internet access point located in a home associated with an authorized account for the video service, wherein the video service is provided from a video service provider to the client device through the home Internet access point;
determining a time restriction for access to at least part of the video service from the video service provider when the client device is initiating connection to the video service via a non-home Internet access point located outside of the home, a duration of the time restriction being dependent upon a usage behavior of the video service by the client device, wherein determining the time restriction comprises:
selecting a first expected usage behavior model from a plurality of expected usage behavior models for the client device, wherein the first expected usage behavior model is selected from the plurality of expected usage behavior models based on the usage behavior of the client device, wherein a first expected usage behavior of the plurality of usage behaviors is associated with a first duration and a second expected usage behavior of the plurality of usage behaviors is associated with a second duration, the second duration being greater than the first duration and the second expected user behavior comprising a longer usage of the home Internet access point than the first expected usage behavior, comparing the usage behavior of the client device to a first expected usage behavior model to determine the duration of the time restriction, determining a score reflecting a similarity of the usage behavior of the client device to the first expected usage behavior model, wherein the score comprises a function of a distance between the usage behavior of the client device and the first expected usage behavior model, and determining the time restriction with the score as an input, wherein the time restriction is inversely proportional to the score; and authorizing the client device to access the at least part of the video service from the video service provider subject to the time restriction when the client device is initiating connection to the video service via the non-home Internet access point.

13. The non-transient computer-readable medium according to claim 12, further comprising building and updating the first expected usage behavior model based on usage behavior feedback from a plurality of client devices.

14. The non-transient computer-readable medium according to claim 12, further comprising:
preparing a query to determine if an identification of the home Internet access point is associated with an authorized account for the video service;
sending the query to an identity provider;
receiving a response to the query from the identity provider, the response indicating the home Internet access point is associated with an authorized account for the video service; and
authorizing the access to the video service and the at least part of the video service based on the response received from the identity provider.

15. The non-transient computer-readable medium according to claim 12, further comprising:
generating an authorization credential authorizing the client device to access the at least part of the video service subject to the time restriction; and
sending the authorization credential to the client device.

* * * * *